(12) United States Patent
Tai et al.

(10) Patent No.: US 6,999,897 B2
(45) Date of Patent: Feb. 14, 2006

(54) METHOD AND RELATED SYSTEM FOR SEMICONDUCTOR EQUIPMENT EARLY WARNING MANAGEMENT

(75) Inventors: Hung-En Tai, Taipei Hsien (TW); Chien-Chung Chen, Hsin-Chu (TW); Haw-Jyue Luo, Hsin-Chu (TW); Sheng-Jen Wang, Hsin-Chu (TW)

(73) Assignee: Powerchip Semiconductor Corp., Hsin-Chu (TW)

( * ) Notice: Subject to any disclaimer, the term of this patent is extended or adjusted under 35 U.S.C. 154(b) by 17 days.

(21) Appl. No.: 10/708,573

(22) Filed: Mar. 11, 2004

(65) Prior Publication Data

US 2005/0203715 A1  Sep. 15, 2005

(51) Int. Cl.
*G11C 7/00* (2006.01)

(52) U.S. Cl. ............. 702/183; 702/184; 702/187; 700/121

(58) Field of Classification Search ........... 702/84, 702/176, 177, 178, 182–185, 187; 705/7, 705/11; 451/8, 1; 438/5; 700/12, 14, 17, 700/19, 108, 117, 121, 174–176, 178, 180; 365/201; 257/E21.525
See application file for complete search history.

(56) References Cited

U.S. PATENT DOCUMENTS

| | | | | |
|---|---|---|---|---|
| 5,408,405 A | * | 4/1995 | Mozumder et al. | 700/31 |
| 6,202,037 B1 | * | 3/2001 | Hattori et al. | 702/182 |
| 6,240,331 B1 | * | 5/2001 | Yun | 700/121 |
| 6,351,723 B1 | * | 2/2002 | Maekawa | 702/185 |
| 6,522,939 B1 | * | 2/2003 | Strauch et al. | 700/116 |
| 6,532,182 B1 | * | 3/2003 | Ogawa et al. | 365/201 |
| 6,745,094 B1 | | 6/2004 | Harakawa et al. | |
| 6,766,283 B1 | * | 7/2004 | Goldman et al. | 703/2 |
| 6,797,526 B1 | * | 9/2004 | Tanaka et al. | 438/5 |
| 6,826,298 B1 | * | 11/2004 | O'Dell et al. | 382/149 |
| 6,828,776 B1 | * | 12/2004 | Tai et al. | 324/158.1 |
| 6,841,403 B1 | * | 1/2005 | Tanaka et al. | 438/14 |
| 6,842,658 B1 | * | 1/2005 | Izawa et al. | 700/121 |
| 6,865,434 B1 | * | 3/2005 | Lin et al. | 700/108 |
| 6,898,539 B1 | * | 5/2005 | Tai et al. | 702/81 |
| 2003/0208286 A1 | * | 11/2003 | Abercrombie | 700/31 |
| 2004/0001619 A1 | * | 1/2004 | Tai et al. | 382/141 |
| 2004/0225384 A1 | * | 11/2004 | Onishi et al. | 700/90 |
| 2005/0004773 A1 | * | 1/2005 | Tai et al. | 702/84 |
| 2005/0038544 A1 | * | 2/2005 | Lin et al. | 700/108 |
| 2005/0095774 A1 | * | 5/2005 | Ushiku et al. | 438/222 |

FOREIGN PATENT DOCUMENTS

| | | |
|---|---|---|
| TW | 494462 | 7/2002 |
| TW | 574743 | 2/2004 |

\* cited by examiner

*Primary Examiner*—Carol S. W. Tsai
(74) *Attorney, Agent, or Firm*—Winston Hsu

(57) ABSTRACT

A method and related system for semiconductor equipment early warning management. The method includes recording process parameters of each piece of equipment, recording equipment parameters when each piece of equipment is processing, evaluating and recording the quality of semiconductor products and corresponding testing parameters, and analyzing a relationship between the corresponding process parameters, the corresponding equipment parameters, and the quality of semiconductor products of each piece of equipment.

14 Claims, 3 Drawing Sheets

METHOD AND RELATED SYSTEM FOR SEMICONDUCTOR EQUIPMENT EARLY WARNING MANAGEMENT

BACKGROUND OF INVENTION

1. Field of the Invention

The present invention relates to a method and related system for semiconductor equipment management, and more particularly, to a method and related system for semiconductor equipment early warning management.

2. Description of the Prior Art

Before each piece of semiconductor equipment is shipped to a semiconductor factory for use in the fabrication and processing of semiconductors, each piece of semiconductor equipment needs to undergo an early warning management initialization to increase the efficiency of the semiconductor equipment by modifying parameters to correspond with different semiconductor processes. In the prior art, early warning management initialization of semiconductor equipment is only performed by an experienced manufacturing engineer, who measures data to analyze and initialize early warning management of semiconductor equipments according to the analytic results. However, the analytic results must been judged and evaluated by the manufacturing engineering to perform early warning management. In addition, analytic knowledge of the semiconductor process is based on the analytic results according to some test items, which include the efficiency of semiconductor equipment, data measures of the semiconductor process, etc. The analytic results are not integrated to provide whole reference data of early warning management of semiconductor equipments. Early warning management knowledge is usually lost when the manufacturing engineer leaves the company, which causes a great loss to the manufacturer.

SUMMARY OF INVENTION

It is therefore an objective of the claimed invention to provide a method and related system for semiconductor early warning management, to solve the above-mentioned problem.

According to the claimed invention, a method and related system for semiconductor early warning management are disclosed, wherein each piece of equipment processes a plurality of semiconductor products according to at least one corresponding process parameter. The method comprises recording each process parameter of each piece of equipment, recoding processing conditions of each piece equipment as at least one corresponding equipment parameter when each piece of equipment processing, evaluating and recording quality of semiconductor products and corresponding testing parameters after each semiconductor product being processed, and analyzing a relation between the corresponding process parameter, the corresponding equipment parameters, and semiconductor product quality of each piece of equipment.

It is an advantage of the claimed invention that the method and related system of semiconductor early warning management analyze and gather statistics of the new semiconductor equipments after initial semiconductor processes, and provide the analytic results in charts and tables way to remote users through networks. The analytic results provide the functions of early warning management such as stability monitor, process modification and monitor, equipment difference modification and monitor.

These and other objectives of the claimed invention will no doubt become obvious to those of ordinary skill in the art after reading the following detailed description of the preferred embodiment that is illustrated in the various figures and drawings.

DETAILED DESCRIPTION

Figure 1:
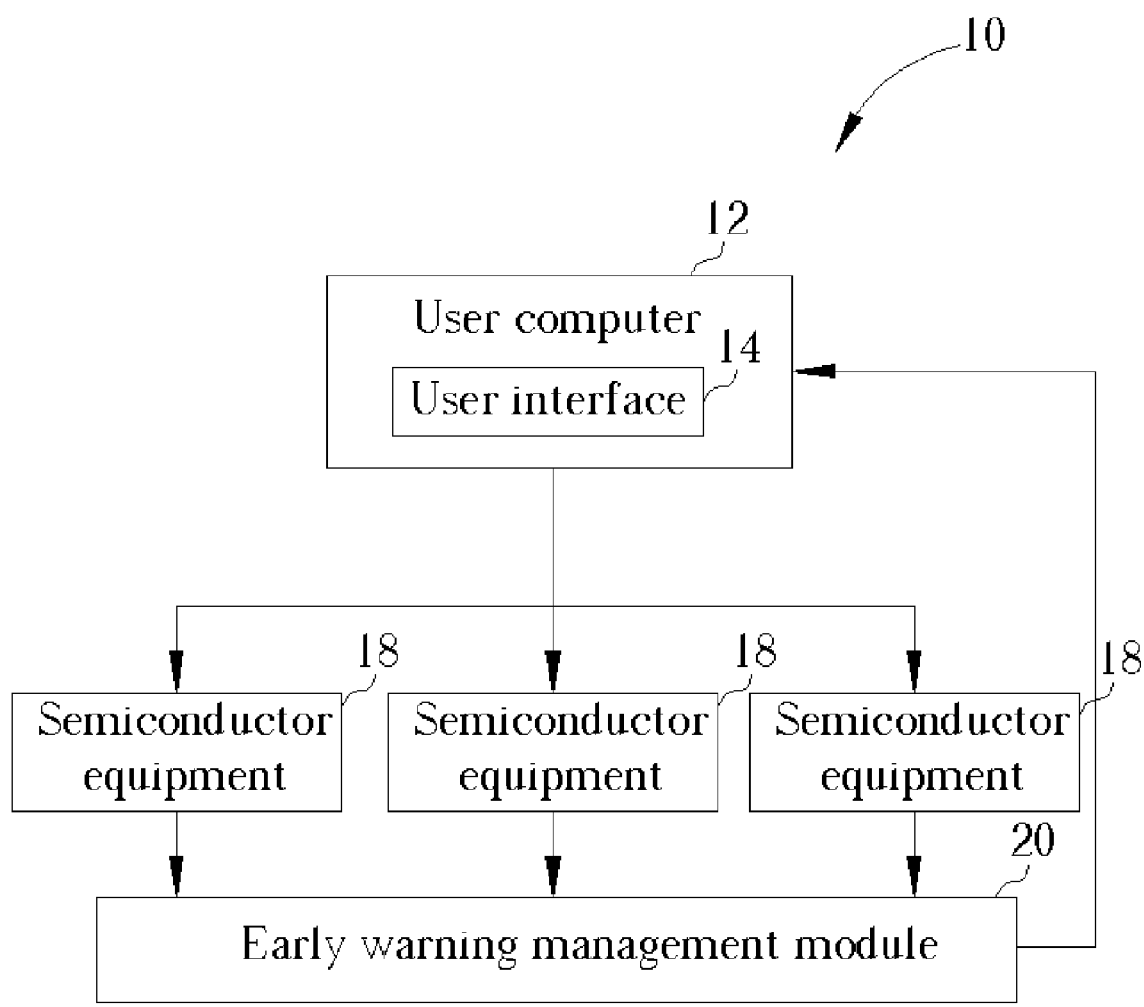
FIG. 1 is a diagram of an early warning system for semiconductor equipment according to the present invention.

Please refer to FIG. 1. FIG. 1 is a diagram of an early warning system 10 for semiconductor equipment according to the present invention. The early warning system 10 comprises a user computer 12, a plurality of semiconductor equipment 18, and an early warning management module 20. The user computer 12 comprises a user interface 14, and is connected to the semiconductor equipment 18 and users using the user interface 14 to perform early warning management of the semiconductor equipment 18. Each piece of semiconductor equipment 18 is connected to the early warning management module 20, and the early warning management module 20 is connected to the user computer 12. When each piece of semiconductor equipment processes semiconductors, the early warning management module 20 records some parameters of the semiconductor process and testing results to analyze and integrate. The early warning management module 20 then transmits the analytic results to the remote user computer 12 through a network. The analytic results are displayed using the user interface 14 by charts and tables. In addition, the early warning management module 20 also forms a monitor feedback interface through the user interface 14 to allow users to monitor and modify early warning management of semiconductor equipments in real-time.

Figure 2:
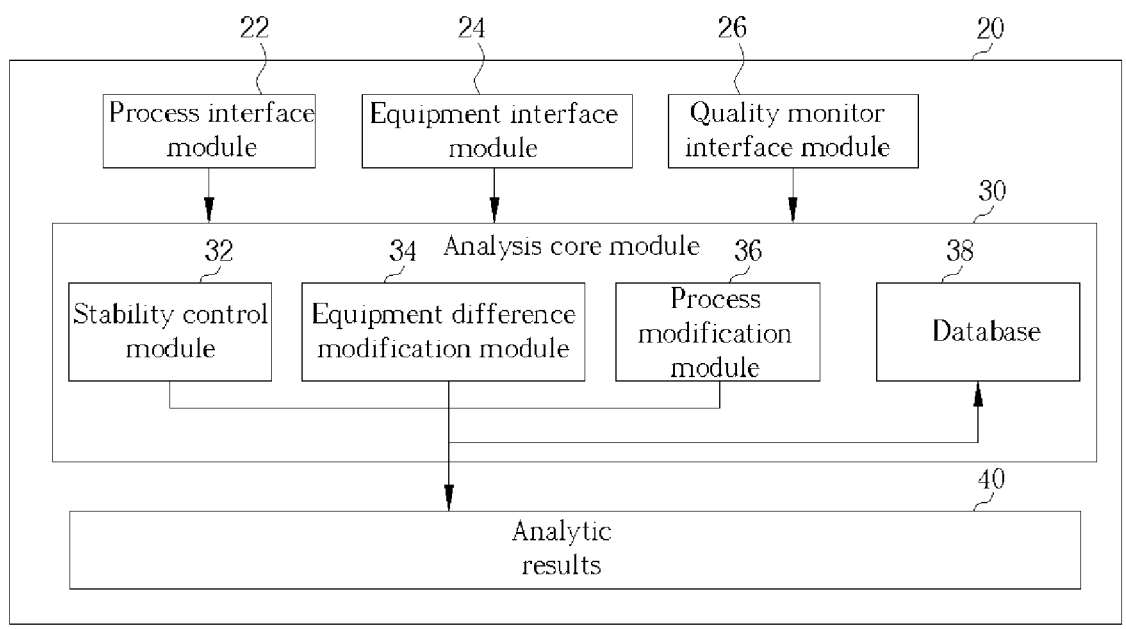
FIG. 2 is a functional block diagram of the management module of the early warning module shown in FIG. 1.

Please refer to FIG. 2. FIG. 2 is a functional block diagram of the early warning management module 20 shown in FIG. 1. The early warning management module 20 comprises a process interface module 22, an equipment interface module 24, and a quality monitor interface module 26, and an analysis core module 30. After each piece of semiconductor equipment 18 shown in FIG. 1 processes a plurality of semiconductor products according to the corresponding parameter, the process interface module 22 receives and records the corresponding process parameter of each piece of semiconductor equipment 18. When each piece of semiconductor equipment 18 processes semiconductors, the equipment interface module 24 records processing conditions of each piece of semiconductor equipment 18 as the corresponding equipment parameters. After each piece of semiconductor equipment 18 processes semiconductors, the quality monitor interface module 26 evaluates and records the quality of each semiconductor product and corresponding testing parameters.

The analysis core module 30 is connected to the process interface module 22, the equipment interface module 24, and the quality monitor interface module 26 for analyzing and gathering statistics of the relationships between the corresponding process parameter, the corresponding equipment parameters, and the semiconductor product quality of each piece of semiconductor equipment 18. The analysis core module 30 comprises a stability control module 32, an equipment difference modification module 34, a process modification module 36, and a database 38. Each module uses T-test, a one-way analysis of variance (ANOVA), a two-way analysis of variance, or box plots to analyze and gather statistics. The analytic results 40 are then transmit to the user computer 12 shown in FIG. 1. The database 38 sores the corresponding equipment parameter, the corresponding process parameters, and the analytic results. The stability control module 32 evaluates and controls the stability of the semiconductor equipment 18. The equipment difference modification module 34 modifies and monitors equipment differences of each piece of semiconductor equipment 18. The process control module 36 modifies and monitors the standard operating procedure (SOP) of the semiconductor process. According to the operation of each module in the analysis core module 30, the relationship between process parameters, equipment parameter, and semiconductor product quality can be used to perform early warning management. For example, after apiece of equipment has operated for a period of time, the piece of equipment can be judged to determine if it operated normally according to the semiconductor product quality of the equipment. In addition, semiconductor companies use different types of equipment to perform the same process. After early warning management, equipment difference can be judged according to the relationship between the corresponding process parameter, the corresponding equipment parameters, and the semiconductor product quality of each piece of equipment. Process parameters and equipment parameters of each piece of equipment can be modified to meet a quality request.

Figure 3:
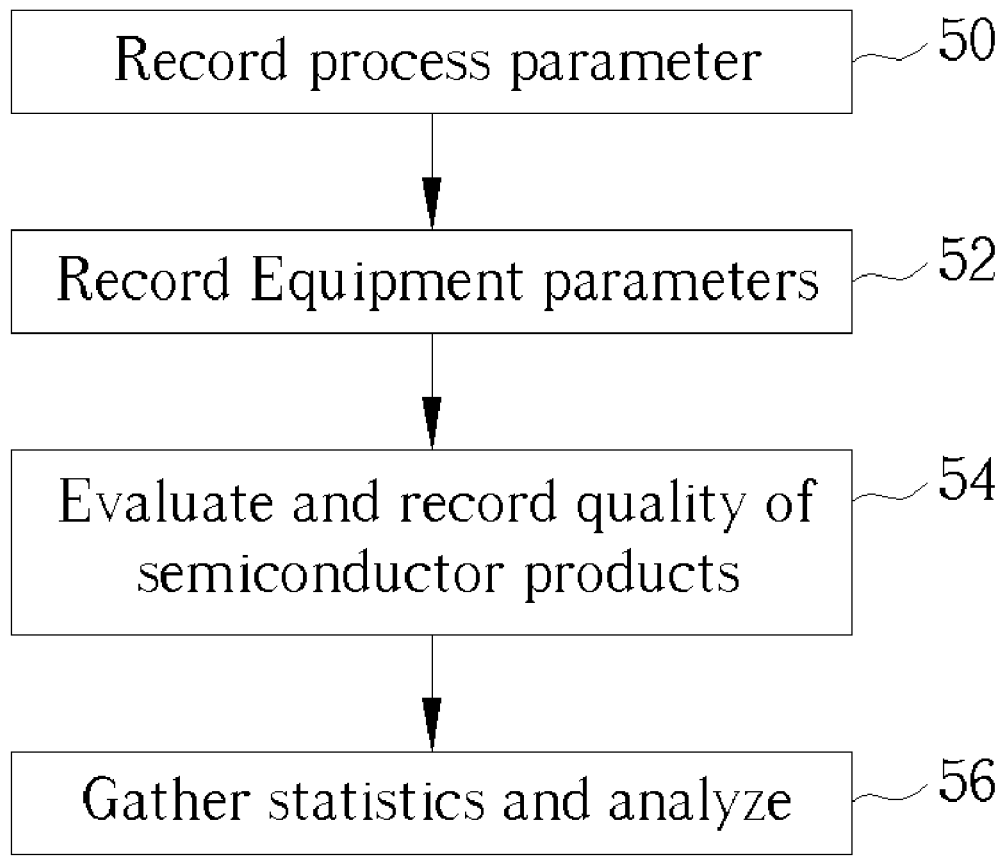
FIG. 3 is a flowchart of an early warning method for semiconductor equipment according to the present invention.

Please refer to FIG. 3. FIG. 3 is a flowchart of an early warning method for semiconductor equipment according to the present invention. The flowchart comprises the following steps:

Step 50: Processing a plurality of semiconductor products according to at least one corresponding process parameter using semiconductor equipment 18, and recording each process parameter of each semiconductor equipment 18 using the process interface module 22.

Step 52: Recoding processing conditions of each piece of equipment 18 as the corresponding equipment parameters when each semiconductor equipment 18 is processing using the equipment interface module 24.

Step 54: Recording the quality of semiconductor products after each semiconductor equipment 18 has processed using the quality monitor interface module 26.

Step 56: Using a T-test, a one-way analysis of variance (ANOVA), a two-way analysis of variance, or box plots to analyze and transmit the analytic results 40 to the user computer 12 shown in FIG. 1 using the analysis core module 30.

The above-mentioned method for semiconductor equipment early warning management analyzes and gathers statistics of testing results, and presents wafer data and statistics of semiconductor products in tables according to processing lots, wafers, and pieces of equipment. The wafer data includes processing steps, processing lots, chambers, processing time, etc. The statistics include wafer testing data for wafer functionality, sample testing data for electric tests, final testing data of the chip package, measuring data and the yield value for each wafer layer or each processing module. The statistics can be shown in the way of a T-test, a one-way analysis of variance (ANOVA), a two-way analysis of variance, or box plots and presented by charts and tables, which provide trend charts of data to perform semiconductor equipment early warning management according to the testing data.

In contrast to the prior art, the method and related system of semiconductor early warning management analyze and gather statistics of new semiconductor equipment after initial semiconductor processes, and provide analytic results in charts and tables to remote users through a network. The analytic results provide the functions of early warning management such as stability monitor, process modification and monitor, and equipment difference modification and monitor.

Those skilled in the art will readily observe that numerous modifications and alterations of the device may be made while retaining the teachings of the invention. Accordingly, that above disclosure should be construed as limited only by the metes and bounds of the appended claims.

What is claimed is:

1. A method for early warning management of at least one piece of semiconductor equipment, each piece of equipment processing a plurality of semiconductor products according to at least one corresponding process parameter, the method comprising:
    recording each process parameter for each piece of equipment;
    recording processing conditions of each piece of equipment as at least one corresponding equipment parameter when each piece of equipment is processing;
    evaluating and recording the quality of semiconductor products and corresponding testing parameters after each semiconductor product has been processed;
    analyzing a relationship between the corresponding process parameter, the corresponding equipment parameters, and the semiconductor product quality for each piece of equipment; and
    selectively utilizing equipment and process parameters so as to optimize the quality and performance of processed semiconductor products.

2. The method of claim 1, wherein the step of analyzing further comprises:
    analyzing equipment difference of two pieces of equipment in the same process according to the semiconductor product quality of at least two pieces of equipment.

3. The method of claim 1, wherein the step of analyzing compares the relationship between the corresponding process parameter, the corresponding equipment parameters, and the semiconductor product quality of each piece of equipment using discriminate analysis.

4. The method of claim 1, wherein the step of analyzing uses a two sample t-test.

5. The method of claim 1, wherein the step of analyzing further comprises:
    using a T-test, a one-way analysis of variance (ANOVA), a two-way analysis of variance, or box plots to analyze.

6. The method of claim 1, further comprising:
    recording the corresponding process parameter, the corresponding equipment parameters, and the analytic results in a database.

7. The method of claim 1, further comprising:
    feedback monitoring to transmit the analytic results to a user through a network or a man-machine interface.

8. A system for early warning management of at least one piece of semiconductor equipment, each piece of equipment processing a plurality of semiconductor products according to at least one corresponding process parameter, the system comprising:

a process interface module for recording each process parameter of each piece of equipment;

an equipment interface module for recoding processing conditions of each piece of equipment as at least one corresponding equipment parameter when each piece of equipment is processing;

a quality monitor interface module for evaluating and encoding the quality of semiconductor products and corresponding testing parameters after each semiconductor product has been processed; and an analysis core module for analyzing a relationship between the corresponding process parameter, the corresponding equipment parameters, and the semiconductor product quality of each piece of equipment, and for selectively utilizing equipment and process parameters so as to optimize the quality and performance of processed semiconductor products.

9. The system of claim 8, wherein the analysis core module analyzes equipment difference of two pieces of equipment in the same process according to the semiconductor product quality of at least two pieces of equipment.

10. The system of claim 8, wherein the analysis core module compares the relationship between the corresponding process parameter, the corresponding equipment parameters, and the semiconductor product quality of each piece of equipment using discriminate analysis.

11. The system of claim 8, wherein the analysis core module uses a two sample t-test.

12. The system of claim 8, wherein the analysis core module analyzes using a T-test, a one-way analysis of variance, a two-way analysis of variance, or box plots.

13. The system of claim 8, further comprising:
a database for recording the corresponding process parameter, the corresponding equipment parameters, and the analytic results of the analysis core module.

14. The system of claim 8, further comprising:
a monitor feedback interface for transmitting the analytic results of the analysis core module to a user through a network or a man-machine interface.

* * * * *